(12) United States Patent
Bailey

(10) Patent No.: US 6,464,507 B1
(45) Date of Patent: Oct. 15, 2002

(54) MAGNETIC COACHING BOARD

(76) Inventor: Kevin Bailey, 4195 Turner Rd., Canandaigua, NY (US) 14424

( * ) Notice: Subject to any disclaimer, the term of this patent is extended or adjusted under 35 U.S.C. 154(b) by 143 days.

(21) Appl. No.: 09/183,876

(22) Filed: Oct. 30, 1998

(51) Int. Cl.$^7$ ................................................ G09B 19/00
(52) U.S. Cl. .................... 434/247; 434/408; 434/429
(58) Field of Search .................... 434/247, 248, 434/416, 408, 415, 365, 403, 428, 429, 430; 206/389, 391, 393, 514

(56) References Cited

U.S. PATENT DOCUMENTS

| | | | |
|---|---|---|---|
| 2,158,368 A | 5/1939 | Hurt | |
| 2,579,105 A | 12/1951 | Baldine | |
| 2,643,466 A | * 6/1953 | Bucher | 434/248 |
| 2,801,476 A | * 8/1957 | Reed | 434/248 |
| 3,093,919 A | 6/1963 | Holtz | |
| 3,560,092 A | * 2/1971 | Coney | 434/248 |
| 3,685,170 A | 8/1972 | Fairleigh | |
| 3,716,931 A | 2/1973 | Loudermilk | |
| 4,534,474 A | * 8/1985 | Ng | 211/70 |
| 4,610,358 A | * 9/1986 | Walter | 206/514 |
| 4,676,527 A | * 6/1987 | Palmer | 281/31 |
| 4,873,193 A | * 10/1989 | Jensen | 436/176 |
| 4,919,618 A | * 4/1990 | Anderson | 434/251 |
| 5,163,845 A | * 11/1992 | Blassingame | 434/408 |
| 5,197,602 A | * 3/1993 | Biesecker | 206/514 |
| 5,203,847 A | 4/1993 | Butt | |
| 5,263,866 A | 11/1993 | Campbell | |
| 5,573,405 A | * 11/1996 | Evans | 434/238 |
| 5,607,312 A | * 3/1997 | Zhou | 434/411 |
| 5,664,780 A | 9/1997 | Bricker | |
| 5,827,072 A | * 10/1998 | Neufer | 434/416 |

* cited by examiner

*Primary Examiner*—Derris H. Banks
*Assistant Examiner*—Kurt Fernstrom
(74) *Attorney, Agent, or Firm*—Brian B. Shaw, Esq.; Stephen B. Salai, Esq.; Harter, Secrest & Emery LLP

(57) ABSTRACT

A sports coaching aid which uses a flexible, rollable, single vinyl magnetic sheet that can adhere to a magnetizable surface. The magnetic sheet is screen-printed to display the markings of a scaled-down sports court or field. Moveable magnetic player and ball pieces are used to show movement when teaching plays, strategies, drills, etc. An erasable marker is included.

21 Claims, 2 Drawing Sheets

MAGNETIC COACHING BOARD

FIELD OF THE INVENTION

This invention relates to a teaching aid for creating a visual display, especially for sports. More specifically, this invention relates to a coaching aid consisting of a sport-specific board and game pieces.

BACKGROUND OF THE INVENTION

Magnetic display arrangements in the prior art have consisted of moveable elements on a single surface. Usually, it has just been either the elements or the single surface which has been magnetic. Some prior art displays have made the single surface magnetic so that the surface may adhere to a magnetizable surface such as a refrigerator door. Other display arrangements have also made boards which are flexible.

Some of the magnetic display arrangements have been used as coaching aids. However, these magnetic display arrangements have not had pieces which have been player specific, color coded to have advanced visibility and had the versatility to be readily attachable and adhereable to a magnetizable surface such as magnetizeable bleachers or to be retainable to the board without any particular underlying surface.

There is a need for a coaching aid which provides for a playing field and pieces which represent players and the ball or puck which is easily transportable and easy to use.

SUMMARY OF THE INVENTION

The present invention provides a coaching aid which is complete in providing a sufficiently detailed playing field or court and sufficient movable player pieces, easy to understand, simple to use and store, easy to transport, and readily attachable to a convenient metallic surface.

The present invention is a display system which comprises a magnetic board and a plurality of magnetic pieces which are placed on the board in which the magnetic field of each of the plurality of pieces is stronger than the magnetic field of the board. The principal source of attachment for a magnetic piece is a magnetizable surface upon which the display board rests.

Color coded player and game ball pieces facilitate understanding in developing game strategies. Assigning unique indicia to the player pieces help distinguish the players on the team from one another.

The storage mode allows all player pieces and board to be stored in one easy-to-carry tube.

DETAILED DESCRIPTION OF THE PREFERRED EMBODIMENT

The preferred embodiment is a flexible magnetic coaching aid with moveable figures. A flexible magnetic sheet is utilized as a display board. The flexible magnetic sheet may be magnetically attached to any magnetizable surface such as a locker, a door, etc. The magnetic sheet may be painted or marked with the markings of a sports court field. Moveable magnetic player and ball pieces can be used to show movement for teaching plays, strategies, drills, etc.

Figure 1A:
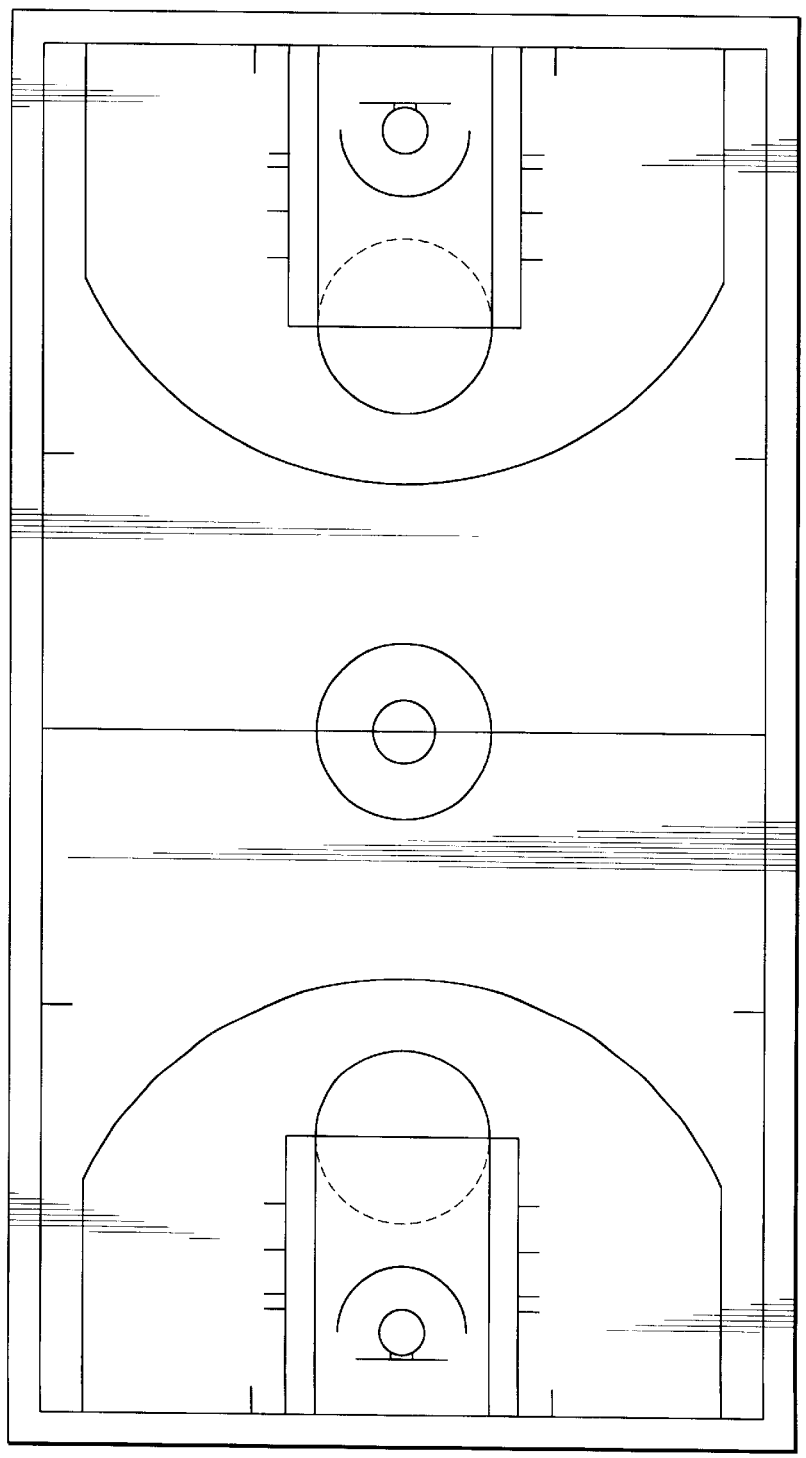
FIG. 1A shows a board.

FIG. 1A shows a board screen printed to represent a basketball court. The board may be customized to represent a sport specific field or half court. Images printed upon the surface of the board will lend to clear understanding by all players and coaches of various game strategies to be employed.

Figure 1B:
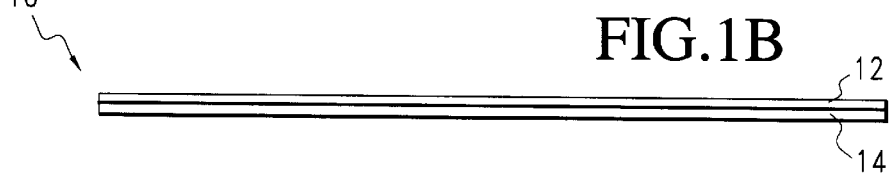
FIG. 1B shows a cross-sectional view of the board.

FIG. 1B shows a cross-sectional cut of the board. The board is a flexible vinyl magnetic sheet which is 15 mil to 60 mil thick, preferably 30 mil thick. The court/field graphics may be comprised of vinyl ink screen-printed with scaled-down dimensions of a court or field of a designated sport. Either half or whole playing fields or courts may be depicted. FIG. 1B shows a vinyl sheet 12 which is adhesively attached, such as by gluing or preferably double sided adhesive tape, to a magnetic layer 14.

Figure 2A:
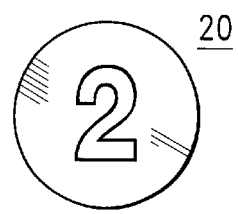
FIG. 2A shows an example of a game piece representing a layer.

FIG. 2A shows a player piece 20. The player piece is comprised of a one-eighth inch to half an inch thick, preferably one-quarter inch thick, one inch diameter magnetic disc with a 30 mil flexible vinyl sheeting glued to both sides and cut into an appropriate shape. Each player may be painted or ink screened a preferential color with a player number or name on the player piece.

Figure 2B:
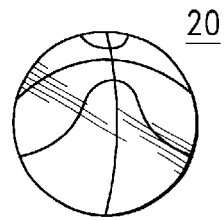
FIG. 2B shows an example of a playing piece such as a basketball.

FIG. 2B shows a ball piece. The ball piece is preferably a flexible magnetic sheeting glued to both sides of a one-quarter inch thick magnet.

Figure 2C:
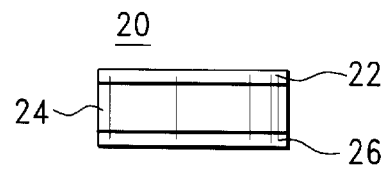
FIG. 2C shows a cross-sectional cut of a piece.

FIG. 2C shows a cross-sectional view of the player piece or game piece. The two vinyl sheets 22 and 26 are glued to a magnetic layer 24. The magnetic layer 24 is a quarter-inch thick magnet.

Figure 3:
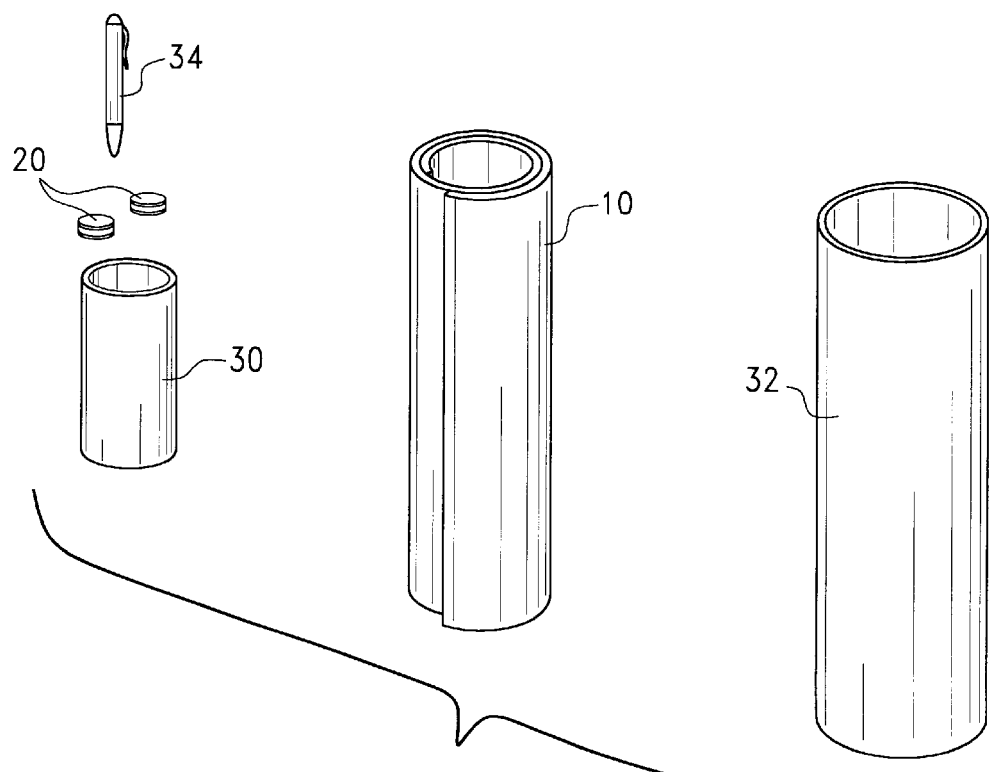
FIG. 3 shows a storage unit for the board and pieces.

FIG. 3 shows a storage unit for the pieces and board. A small two to three inch, preferably two inch, diameter cylindrical tube 30 is used to store the piece 20 and a marker 34. The flexible board is wrapped around the small storage tube 30. Thereupon, the board and small tube 30 are placed in a large three to four inch, preferably three inch, diameter tube 32. This results in a unique, easy-to-carry storage mechanism for a coaching aid.

Setting up the board and pieces is simple. A magnetizeable flat surface of sufficient area and preferably extending vertically is used to attached the magnetic board to the magnetizeable flat surface. Thereafter, the color-coded game pieces, including team specific color-coded player pieces are attached to the board. Another color-coded game piece serves as a ball or puck.

Although the board and pieces are manufactured so as to have a magnetic attraction to each other, the game pieces are principally magnetically adhered through the board to the magnetizeable surface. The board may be placed on a horizontal or slightly inclined to the horizontal non-magnetic surface, if needed.

Player pieces and the ball or puck piece are moved to show desired positioning for a play. An erasable marker is used to draw player travel paths and ball or puck paths to enhance understanding.

When the strategy session is over, the game pieces and marker are placed in the smaller two tubes, the board is wrapped around the smaller tube, and the board and the smaller tube are placed in the larger tube. This allows for easy transport and storage.

Many further modifications will readily occur to those skilled in the art and the specific embodiments illustrated are given by way of example only and should not be considered as limiting the scope of the invention as defined in accordance with the attached claims.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A display system, comprising:
   a board, the board being magnetic and single integral sheet, and
   a plurality of pieces which are placed on the board, each of the plurality of pieces being magnetic, the magnetic field of each of the plurality of pieces being stronger than the magnetic field of the board.

2. The display system of claim 1, wherein the board is flexible.

3. The display system of claim 2, wherein the board attaches to a magnetizable surface.

4. The display system of claim 3, further comprising an erasable marker.

5. The display system of claim 1, wherein both the board and each of the plurality of pieces on the board are magnetically attachable to a magnetizable surface.

6. The display system of claim 1, wherein each of the plurality of pieces on the board is magnetically attracted to a magnetizable surface through the board.

7. The display system of claim 2, wherein the board is a rollable, single sheet.

8. The display system of claim 7, further comprising:
   a storage unit for storing the board and plurality of pieces.

9. The display system of claim 8, wherein the storage unit comprises;
   a first tube for storing the game pieces, the first tube having a first diameter; and
   a second tube for storing the first tube and the board, the second tube having a second diameter, wherein the board wraps around the first tube.

10. The display system of claim 1, wherein the board is formed from a magnetizable layer and a vinyl layer.

11. The display system of claim 10, wherein the pieces are formed from a quarter inch thick magnet.

12. The display system of claim 1, wherein the board comprises a vinyl layer upon which a user may write with an erasable marker.

13. The display system of claim 12, wherein the vinyl layer of the board is screen printed with a depiction of a playing field for a sport.

14. The display system of claim 13, wherein the sport is one of basketball, baseball, lacrosse, soccer, field hockey, ice hockey, tennis, football, volleyball, softball, rugby, cricket or polo.

15. The display system of claim 13, wherein the playing field depicted on the board is a scaled down version of an actual whole or half playing field or court.

16. The display system of claim 3, wherein each of the pieces is principally attracted to the magnetizable surface and secondarily attracted to the board.

17. A display system, comprising:
   a board, and
   a plurality of pieces which are placed on or attached to the board, wherein the board is a magnetic and flexible single sheet and each of the plurality of pieces is magnetic, each of the plurality of pieces has a stronger magnetic field than has the magnet of the board.

18. The display system of claim 17, wherein the board is magnetically attachable to a magnetizable surface.

19. The display system of claim 18, wherein the surface is one of a magnetizable blackboard, magnetizable whiteboard, magnetizable locker, magnetizable bleachers or a magnetizable door.

20. The display system of claim 19, wherein the board is rollable.

21. A coaching aid for a team sport or activity, comprising
   a board formed of a flexible, rollable, single, integral sheet of a magnetic material adhered with a writeable and erasable vinyl sheet, the board being attachable to a magnetizable surface, the board depicting a half or full court or playing field;
   a plurality of participant pieces, each participant piece formed of a magnetic center disc and a bottom and top printed vinyl sheet and magnetically adhereable to the board;
   an erasable marker for writing upon the vinyl sheet of the board;
   a smaller diameter tube for storing the wet marker and the plurality of participant pieces, the board being adapted to roll around the smaller diameter tube; and
   a larger diameter tube for storing the smaller diameter tube and the board; wherein the team sport or activity includes one of basketball, baseball, lacrosse, soccer, field hockey, ice hockey, tennis, football, volleyball, softball, rugby, cricket or polo; wherein the magnetic field of each of the plurality of participant pieces is stronger than the magnetic field of the board and magnetic adherence of the participant pieces is principally through the magnetizable surface.

* * * * *